Figure 1:
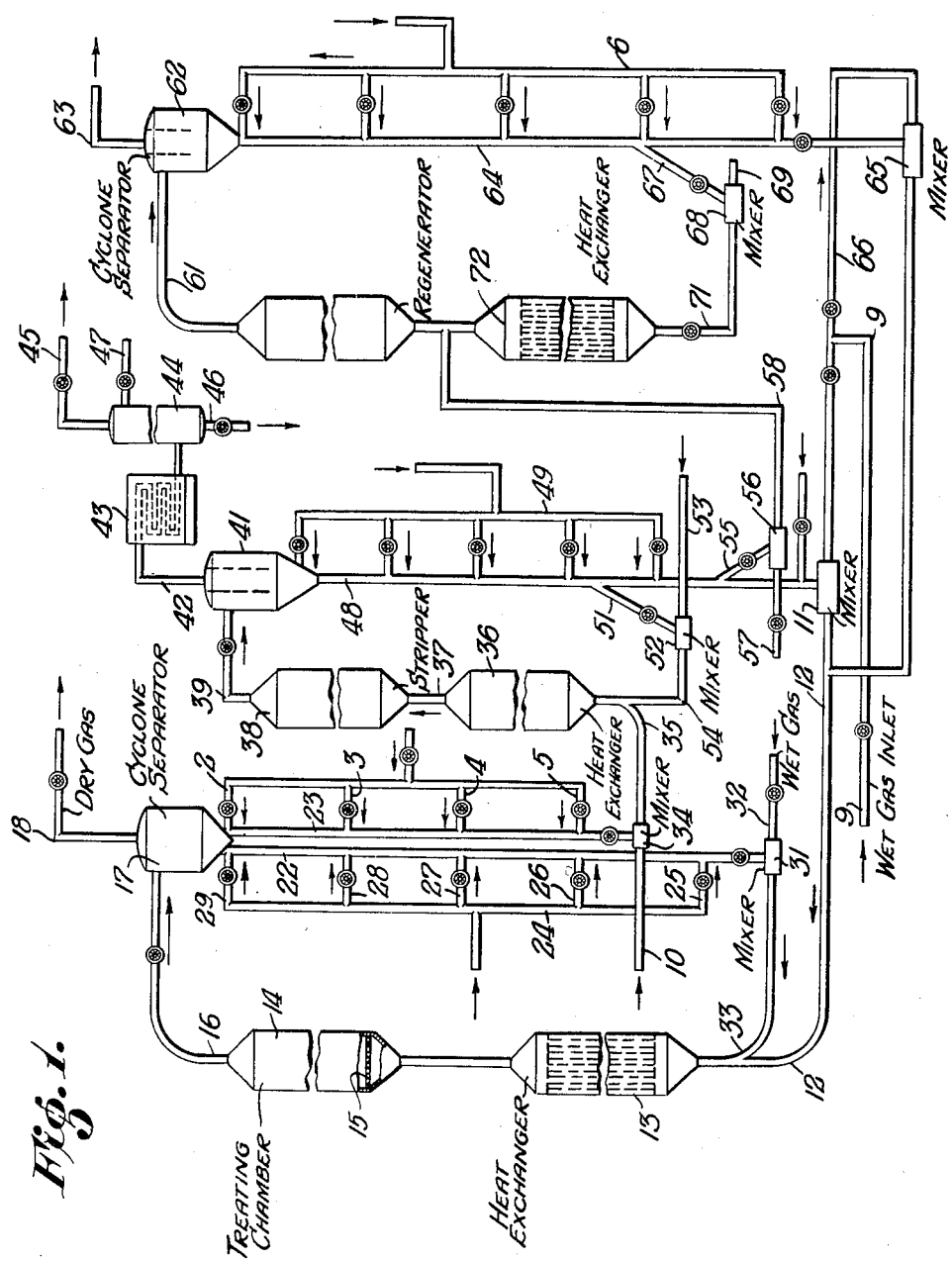

INVENTOR:
EGER V. MURPHREE,
By Henry Berks
ATTORNEY

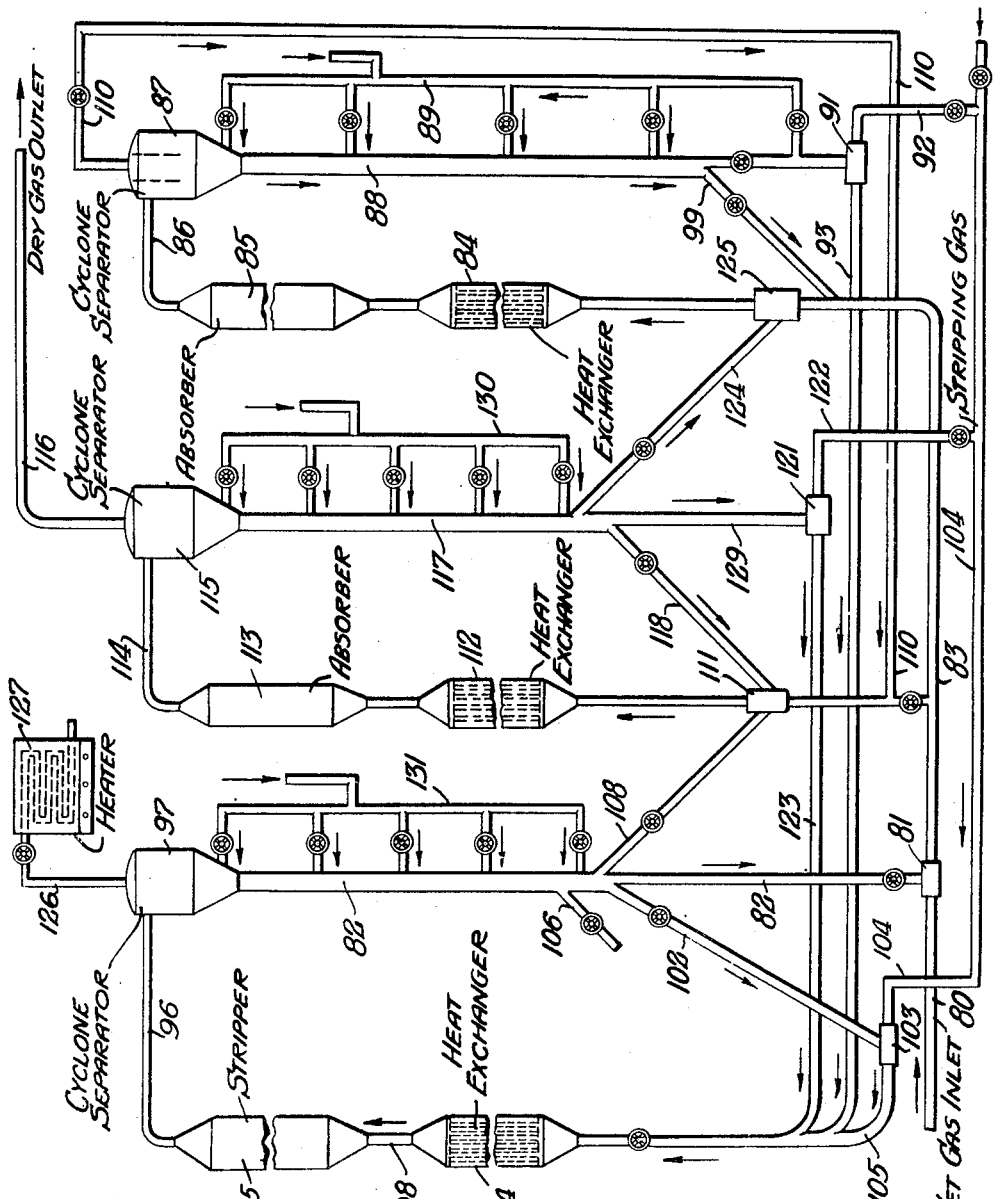

Patented July 11, 1950

2,515,134

UNITED STATES PATENT OFFICE 2,515,134

SEPARATION OF BUTADIENE FROM HYDROCARBON GASES WITH CUPROUS CHLORIDE

Eger V. Murphree, Summit, N. J., assignor to Standard Oil Development Company, a corporation of Delaware Original application March 1, 1941, Serial No. 381,294, now Patent No. 2,446,076, dated July 27, 1948. Divided and this application December 31, 1946, Serial No. 719,404

2 Claims. (Cl. 260—681.5)

This invention relates to the separation and purification of gases wherein the gases are treated with a finely-divided adsorbent material and pertains more particularly to a process of and apparatus for selectively removing certain gaseous constituents from a gas mixture.

The invention finds application in many industrial processes, such as recovery of solvent vapors from air in dry cleaning and painting establishments, drying of air as in air conditioning, recovery of benzene and other aromatics from coal and coke oven gas, recovery of butane and other higher boiling hydrocarbons from natural and casinghead gas and separation of higher boiling hydrocarbon vapors from lower boiling hydrocarbons by selective adsorption or absorption. Other applications of this type will suggest themselves to those skilled in the art.

In connection with the above-named processes, it has previously been proposed to contact gases to be purified or separated with a solid adsorbent material capable of selectively adsorbing or removing certain constituents of such gases. The adsorbent material after being saturated with adsorbed or absorbed gases is thereafter treated to remove the adsorbed materials contained therein. The removal may be accomplished by heating to distill the adsorbed gases. The removal of such gas may be further expedited by use of a stripping gas in lieu of or in addition to the heating step.

Two general types of processes have heretofore been proposed to obtain these results. According to one of the general types of operation, the gases to be treated are passed through a treating zone containing a fixed mass of adsorbent material and the passage of the gases is continued until the adsorbent material is more or less saturated with adsorbed gases. After this, the operation is interrupted, the adsorbed gases expelled from the material, and the process again resumed.

One serious objection to this type of process from an economic viewpoint is the necessity of frequently interrupting the flow of gases in order to remove adsorbed constituents from the adsorbents. In order to operate the process in a continuous manner, it is necessary to provide a plurality of treating chambers so that the stream of gases being treated can be transferred from one chamber to another when it becomes necessary to remove the adsorbed gases from the adsorbent medium.

In view of the inherent objections to discontinuous processes of this type, it has also been proposed to introduce the adsorbent material into the stream of gases to be treated and to pass the resulting stream through a treating zone. Following this the adsorbed material is separated from the unadsorbed gases and adsorbent material treated in a separate zone to remove the constituents adsorbed therein and the stripped adsorbent material then returned to the treating zone. While this method of operation avoids many of the objections to the discontinuous process of the type previously mentioned, it is nevertheless open to other serious objections which have prevented its general adaptation on an extensive commercial scale. One of the serious objections to this type of operation is the difficulties involved in circulating the finely-divided adsorbent material through the system.

Perhaps one of the most serious difficulties encountered in operating a continuous process of this character is the provision of mechanism for building up sufficient pressure to feed the finely-divided material into the stream of gases to be treated. First of all, the pressure on the gases passing through the treating zone must be at least sufficient to overcome the pressure drop through the apparatus, which in turn will depend on a number of factors, perhaps the most important of which is the velocity of the gases passing through the system. One of the most common means employed heretofore for reintroducing the powdered adsorbent material into the gaseous stream is the use of a mechanical conveyor such as a compression screw. Such a conveyor, however, has not proven entirely satisfactory for use on adsorbent materials of this character due to the erosion and abrasion of the screw by the adsorbent material. Furthermore, the power consumption for driving the screw increases disproportionately with increase in pressure. For example, a twofold increase in pressure drop across the screw results in more than a twofold increase in power consumption necessary to drive the screw.

In view of these and other factors, continuous processes of the character heretofore mentioned have not found extensive favor for the purification and segregation of gases.

The object of the present invention is to provide a continuous process and apparatus for the segregation and purification of gases by selective adsorbents which will not be subject to the objections herebefore noted.

Other objects and advantages of the invention will be apparent from the more detailed description hereinafter. For a better understanding of the invention, reference will be made to the accompanying drawing wherein Figure 1 is a diagrammatic illustration of one form of apparatus suitable for carrying the invention into effect and Figure 2 is a modified form of the apparatus for carrying out a second embodiment of the invention.

Referring to Figure 1 of the drawing, the reference character 9 designates a charge line through which the gas to be treated or purified is introduced into the system. As previously mentioned, this gas may be any type of gas which is desired to be purified, refined or otherwise treated with solid material for the selective removal of certain constituents thereof.

Returning to the drawing, a part or all of the gas is introduced and passed through line 9 to a mixing chamber 11 in which it is admixed with a solid adsorbent material which may be of the nature of oxide gel, activated carbon, adsorbent clays, or the like. This product is preferably in finely-divided form, capable of selectively adsorbing the certain constituents from the gases. The mixture of gas and adsorbent material is then passed from mixing chamber 11 through line 12 having a heat exchanger 13 to a treating chamber 14 in which the powdered material is intimately mixed with the gases to be treated.

In case the adsorbing agent introduced into the mixing chamber 11 is in highly heated condition, such as in the case when the adsorbing agent is freshly separated from the stripping gas or has been subjected to regeneration, the heat exchanger 13 may be used to cool the mixture to the desired temperature for absorption. In other cases where the adsorbing agent and gas to be treated are relatively cool as in starting the process, the heat exchanger 13 may be used for heating the mixture.

One of the important features of the present invention is the passage of the mixture of adsorbent material and gases through the adsorbent chamber at a relatively low velocity so that there is a tendency for the powdered adsorbent material to settle or separate from the gases. However, the rate of flow of the gases is greater than the rate of settling so that the tower never becomes completely packed with powdered material.

By operating in this manner, an intimate and continuous intermingling of the adsorbent solids and gases is attained. Furthermore, the residence time of the adsorbent material within the adsorber may be regulated over a wide range so as to insure complete saturation of the adsorbent material before removal from the chamber. It will be understood, however, that the residence time of the adsorbent material within the adsorber 14 will usually be considerably greater than the residence time of the gases within the chamber. For example, the time required for passage of the adsorbent material through the adsorber may range from 20 seconds to one hour or more, whereas the time required for the passage of the gases through the chamber may be of the order of from 2 seconds to 10 minutes. Expressed in other words, the density of the gases and the powdered material within the adsorber 14 is normally greater than the density of the stream passing to and from said chamber. To insure distribution of the gases and the solid material throughout the adsorber, the chamber may be provided with distributing plate 15 having spaced perforations through which the suspension of solids and gases passes.

The products after passing through the adsorber 14 are transferred through line 16 to a suitable separator such as a cyclone separator 17 for removing dust or other solids from gases.

The gas after passing through the initial separator 17 is withdrawn through line 18 and, if desired, may be passed to additional separators (not shown) for further purification before being vented from the system.

Adsorbent material separated from the gas in the separator 17 feeds by gravity into the top of a standpipe or tower 22 from which it may be returned to the adsorber as later described or into a second standpipe 23 from which it may be passed to a stripping zone to be later described. The height of the tower 22 is sufficient to develop a static pressure of powder at the bottom thereof sufficient to feed the adsorbent material into a stream of gases being recycled to the heat exchanger 13 and adsorber 14. In other words, the head of adsorbent material maintained in the vertical column 22 should be sufficient to develop a pressure at the bottom thereof which will overcome the pressure drop through the heat exchanger 13, adsorber 14 and the connecting lines. In order to transmit the pressure through the adsorbent material mass in the column 22, it is essential that the mass contained therein be in a freely flowing, fluidized condition. To insure this, a fluidizing gas may be introduced at any one or more spaced points along the length of the tower through line 24 having branched lines 25, 26, 27, 28 and 29, respectively. The adsorbent material from the bottom of the standpipe 22 may be fed into a mixing chamber 31 from which it may be remixed with wet gas to be treated which is introduced into the mixing chamber through line 32. The resulting mixture of wet gas and recycled adsorbent agent passes through line 33 to the heat exchanger 13 where it intermixes with additional wet gas introduced through line 10.

Adsorbent material collected in the standpipe 23 discharges from the bottom thereof into a mixing chamber 34 wherein it admixes with a suitable inert stripping gas such as steam, carbon dioxide, spent combustion gases, or the like introduced into the mixing chamber through line 10. The height of the standpipe 23 which charges the adsorbent material into the stripping gas should be of a height sufficient to develop a pressure at the bottom thereof which will feed the solid contact material into the stripping gas which in turn must be under a pressure at least sufficient to pass the resulting mixture through the stripping zone and related equipment. A fluidizing gas may be introduced from a main line 1 at any one or more spaced points through inlet lines 2, 3, 4 and 5 along the vertical column 23 to maintain the adsorbent material in freely flowing condition as in the case of column 22.

The mixture of adsorbent material and stripping gas passes from the mixing chamber 34 through line 35 to a heat exchanger 36 wherein the mixture is heated to a temperature sufficient to liberate gases adsorbed on the adsorbent material during passage through the adsorber 14. The heated products from the heat exchanger 36 then pass through line 37 to a stripping chamber 38 wherein the adsorbent material is retained for a period sufficient to distill or strip the adsorbent material of the adsorbed products.

The velocity of the carrier gas through the stripping chamber 38 is controlled as previously described in connection with the adsorber 14 so that the adsorbent material travels at a materially lower velocity than the gases. As a result, there is a continuous intermixing of gas and powder.

The mixture of gases and adsorbent material passes from the stripper 38 through line 39 into a suitable separator such as a cyclone separator 41 in which the bulk of the stripped adsorbent material is separated from the gases.

Gases separated from the adsorbent material in the separator 41 are removed therefrom through line 42 and are passed to a suitable condenser 43 in which the stripping gas or adsorbed gases or both may be condensed. Products from the condenser 43 pass to a receiver 44 wherein liquid condensate separates from unvaporized gases. In cases where both the stripping agent and stripped vapors or gases are condensable to form non-miscible liquids as is the case of steam and oil vapors, practically all the products from line 42 will be condensed in condenser 43.

The products from the condenser 43 may pass to a receiver 44 in which the liquid separates from the uncondensed vapors or gases and separate liquid phases are separated into layers. Uncondensed gases are withdrawn from the receiver 44 through line 45 and may be rejected from the system or otherwise treated in any desired manner. The heaviest liquid layer separated in the receiver 44, which may be water in case steam is used as a stripping agent, may be withdrawn from the bottom of the receiver through line 46. The lighter liquid, which may be the oil stripped from the wet gases, may be withdrawn from the receiver 44 through line 47.

Adsorbent material separated in the cylone separator 41 discharges into standpipe or vertical column 48 of a height at least sufficient to produce a head of pressure at the bottom which will permit feeding the absorbent material back into the mixing chamber 11 where it meets a stream of wet gas passing to the adsorber 14.

In order to insure an even flow of the powdered material through the vertical column 48, a fluidizing gas may be introduced at one or more spaced points along the length thereof by means of fluidizing gas system 49 and in the hopper section of the separator 41.

If desired, a portion of the stripped adsorbent material from the vertical column or standpipe 48 may be recirculated through the heat exchanger 36 and stripper 38 to maintain the desired temperature within the stripping chamber. For example, a portion of the stripped adsorbing material from tower 48 may be passed through line 51 to a mixing chamber 52 wherein it is picked up by a stream of gas introduced through line 53. The resulting mixture passes through line 54 which merges with line 35 carrying the fresh unstripped adsorbent material to the heat exchanger 36. By regulating the amount of stripped powder recycled through the heater to the stripping zone, any amount of heat may be supplied at any desired temperature level without the application of external heat to the stripper.

In many types of operations it may also be desirable to subject some or all of the absorbent material to a reactivating treatment to remove foreign deposits which may form on the material during the adsorbing operation.

Referring again to the drawings, a part or all of the stripped adsorbent material from column 48 may be passed through conduit 55 to a mixing chamber 56 and there intermixed with a regenerating gas such as air or a mixture of air and diluent gas introduced into the mixing chamber through line 57. The resulting suspension is then passed through line 58 to a regenerating zone 59. The velocity of the regenerating gas flowing through the regenerating chamber 59 may be controlled in such a manner that the time of residence of the adsorbent material within the reactor is considerably greater than the time of residence of the regenerating gas as in the case of the adsorber and stripping chamber. The length of time the adsorbent material is retained in the regenerator should be sufficient to complete the regeneration and is usually at least twice the time required for the regenerating gas.

The regeneration may take the form of an oxidizing treatment, particularly when the adsorbent material is employed for removing hydrocarbons or other carbonaceous or sulphur-containing materials from gases at elevated temperatures.

The stream of regenerating gas and absorbent material after passing through the regenerating chamber 59 may be passed through line 61 to a suitable separator 62 for separation of the regenerated adsorbent material from the regenerating gas. The regenerating gas may be rejected from the system through line 63. Regenerated material separated in cyclone separator 62 discharges into a vertical tower or standpipe 64 from which it passes to mixing chamber 65 and is remixed with a stream of gas to be treated introduced through lines 9 and 66. When the regenerating treatment is employed, the height of the tower 64 should be sufficient to form a head of pressure which will feed the adsorbent material into the stream of wet gas which in turn must be under a pressure at least sufficient to overcome the pressure drop through the adsorbing portion of the apparatus. A fluidizing gas may be introduced by means of fluidizing gas system 6 into the column 64 and the hopper above the column at one or more spaced points to maintain the powder therein in freely flowing condition.

In many cases it may also be desirable to recirculate a portion of the regenerated material through the regenerator to add or subtract heat therefrom. To this end a portion of regenerated material from column 64 may be passed through line 67 to a mixing chamber 68 where it is picked up by a carrier gas from line 69. The suspension of carrier gas and regenerated powder then passes through line 71 to a heat exchanger 72 where the temperature is adjusted. The suspension after passing through the heat exchanger is remixed with unregenerated powder and regenerating gas passing through line 58. In cases where the regeneration treatment is strongly exothermic, heat may be extracted through heat exchanger 72. In other cases it may be desirable to supply heat to the regenerating zone.

In the embodiment shown in Fig. 1, the absorption of gases is accomplished in a single stage. In many cases it is desirable to subject the gases to successive-stage absorbing treatment. For example, it is difficult, if not impossible, to so control the absorbing process so as to carry out the gas treatment to completion and at the same time saturate the absorbent material before the stripping step. In view of this it may be desirable to carry out the final absorbing treatment with freshly-stripped or freshly-regenerated powder under conditions such that the powder is not completely saturated. When operating in this manner, the powder recovered from the finally treated gases may be used in the initial or intermediate stages of the absorbing treatment without intermediate stripping. As a further alternative, freshly - stripped or freshly - regenerated powder may be employed as absorbing agent in each of the absorbing stages and the relative amount of powder, the temperature or other factors may be independently controlled to obtain the desired separation of this purification as the case may be. Apparatus for carrying out successive-stage absorption treatment with powder is shown in Fig. 2. For simplicity, the apparatus for regenerating the powder has been omitted, it being understood that such regenerating equipment, similar to that shown in Fig. 1, may be employed if desired.

Referring now to Fig. 2, the reference character 80 designates a line through which the gases or vapors to be treated are introduced into the system. The gas is introduced through line 80 and passes into a mixing chamber 81 in which it intermixes with stripped absorbent powder introduced through standpipe 82. As previously described with reference to Fig. 1, the powdered material within the standpipe 82 should be maintained in freely flowing state and the height of the column should be at least sufficient to build up a static pressure equal to the pressure of the gases introduced into the mixing chamber 81. This pressure must, in turn, be at least sufficient to overcome the flow resistance of the circuit through which the resulting suspension must pass.

The resulting suspension of gases and absorbent powder passes from mixing chamber 81 through line 83 to heat exchanger 84 in which the temperature is adjusted prior to passing to the first-stage absorber 85.

As mentioned with reference to Fig. 1, the velocity of the gases passing through the absorbing chamber 85 is controlled to maintain a relatively dense phase of absorbent powder therein. In other words, the velocity of the gases is not sufficient to carry the powder through the reaction chamber at substantially the same rate as is the case of the gases. As a result, the time required for the passage of the powder through the absorbing chamber is materially longer than the time required for the passage of the gases and these relative times can be controlled over extended ranges.

The time during which the powdered material is retained within the first absorber may be regulated to more or less thoroughly saturate the powder prior to removal from the absorbing chamber.

The suspension of treated gas and absorbent powder passes from the first stage absorber 85 through line 86 to a suitable separator such as a cyclone separator 87 in which the absorbent powder separates from the gases. The powdered absorbent material separated in the cyclone separator 87 discharges into a standpipe 88 which is maintained in fluidized condition by means of a suitable fluidizing gas introduced through line 89 and suitable branch lines leading therefrom.

The absorbent powder, which is more or less saturated with absorbed gases, discharges from the bottom of the standpipe 88 into a mixing chamber 91 in which it admixes with a suitable stripping gas introduced through line 92. The resulting suspension of stripping gas and powder passes from mixing chamber 91 through line 93 into a heat exchanger 94 wherein it is heated to a temperature sufficient to distill or otherwise remove the absorbed gases contained therein. Products from the heat exchanger 94 are passed through line 96 to a stripping chamber 95 wherein the absorbent powder is maintained for a period sufficient to distill or vaporize the absorbent products contained thereon.

Products from the stripping chamber 95 are thereafter passed through line 96 to a cyclone separator 97, or other equivalent device, for the separation of stripped products from the absorbent powder. The velocity of the stripping gas passing through the stripping chamber 95 is preferably controlled to build up a dense phase within the stripping zone so that the residence time of contact of the absorbent powder is fairly longer than the time of residence of the stripping gas within the stripping chamber. Returning again to the standpipe 88, if desired a portion of the contact material contained therein may be recycled to the heat exchanger 84 and the first absorber 85 through line 99 to serve in controlling the temperature therein.

Returning now to the cyclone separator 97, stripped powder separated in cyclone separator 97 discharges into a standpipe 82 from which the powder is discharged from the bottom thereof into the mixing chamber 81 where it admixes with the gases to be treated. The height of the standpipe 82 can be sufficient to develop a pressure at the bottom thereof sufficient to develop a pressure at least equal to the pressure of the wet gas introduced through line 80.

If desired, a portion of the powder from the standpipe 82 in which the powder is kept in a fluid condition by means of fluidizing gas system 130 may be passed through line 102 into a mixing chamber 103 where it is picked up by a stripping gas introduced through line 104. The resulting mixture of stripping gas and stripped powder may be passed through line 105 to heat exchanger 94 wherein it admixes with unstripped powder and stripping gas introduced through line 93.

Also, if desired, a portion of the stripped powder from the standpipe 82 may be withdrawn therefrom through line 106 and passed to suitable regenerating equipment (not shown). Such regenerating equipment may, for example, comprise the type of apparatus illustrated in Fig. 1, or it may comprise other suitable means for reactivating the powder.

Also, a portion of the powder from the standpipe 82 may be withdrawn through line 108 and passed to a stream of gases being introduced into the second-stage absorber as hereinafter described.

Returning again to the cyclone separator 87 which receives products from the first-stage absorber 85, gases separated therein are removed from cyclone separator 87 through line 110.

In accordance with this embodiment of the invention, the gases are passed from line 110 into a mixing chamber 111 where they are again admixed with freshly-stripped powder withdrawn from the standpipe 82 through line 108.

The mixture of powder and gases formed in the mixing chamber 111 then passes to a heat exchanger 112 in which the temperature is adjusted to favor the absorption step. Following this, the products pass through a second-stage absorber 113 wherein the gases are subjected to the final treatment. Products from the second-stage absorber 113 pass through line 114 to a cyclone separator 115, or other equivalent device wherein the absorbent powder is separated from the treated gases. The treated gases are removed from cyclone separator 115 through line 116 and may be rejected from the system or treated in any desired manner outside the purview of the present invention. Absorbent powder, separated from the treated gases in the cyclone separator, discharges into a standpipe 117 in which the powder is kept in a fluid condition by means of fluidizing gas system 130. If desired, a portion of the powder may be withdrawn from the standpipe 117 and recirculated through the second-stage absorber through line 118 and mixing chamber 111. Also, a part or all of the powder collected in the standpipe 117 may be withdrawn from the bottom thereof through line 129 and passed to a mixing chamber 121 wherein it admixes with stripping gas introduced through line 112. In this case, the mixture of stripping gas and powder passes through line 123 to the heat exchanger 94 and stripping zone 95.

However, in accordance with the preferred embodiment of the invention, the powder collected in the standpipe 117 is first utilized in the first-stage absorber 85 before passing through the stripping section of the equipment. To this end, a part or all of the powder from the standpipe 117 may be passed through line 124 to a mixing chamber 125 wherein it admixes with fresh gas to be treated introduced through line 80. In this latter case, a valve in the bottom of standpipe 82 may be closed so as to prevent the introduction of freshly-stripped powder into the fresh gas stream, or a part of the freshly-stripped powder may be added to the wet gas in addition to the powder introduced through line 125.

While Fig. 2 illustrates only two absorbing stages, it will be understood that, if desired, an additional number of stages may be employed.

As previously mentioned, one of the important features of the modification shown in Fig. 2 is the passing of the fresh gases to be treated in contact with partially used powder and then starting the gases from the first-stage treatment into contact with fresh powder before rejecting the treated gas from the system.

It will also be understood that in accordance with the modification shown in Fig. 2, the stripped product from the cyclone separator 97 may be passed through line 126 to a condenser 127 wherein the stripped gases, stripping gas, or both products may be condensed. The resulting products are then passed to a suitable receiver, such as shown in Fig. 1, for segregation of the stripped products from the stripping gas. If desired, the stripping gas may be again reused in the system.

The present invention finds wide application in the purification and recovery of gases and vapors. In the foregoing embodiment the purification has been accomplished by physical adsorption or absorption of the impurities from the gases. Purification may also be obtained according to the present invention by contacting the gases to be purified or otherwise treated with a solid material capable of reacting with the impurities to form new compounds. Such treating processes may involve, for example, the removal of hydrogen sulfide from gases by treating the gases with a solid alkaline or alkaline earth hydroxide supported on a suitable inert carrier. Such purification may also be obtained by treating the hydrogen sulfide-containing gases with ferric oxide, nickel oxide, or copper oxide supported on a carrier if desired. In such cases, regeneration can be accomplished by reconverting the nickel, copper, or ferric sulfide resulting from the purifying treatment back to the oxide by oxidizing treatment.

As another example, carbon dioxide may be selectively removed from air, flue gases, or the like by treatment with finely-divided sodium carbonate in the manner herein described.

Butadiene may be extracted from hydrocarbon gases by treatment with finely-divided cuprous chloride, either alone or on a suitable adsorptive carrier. In either case, regeneration may be accomplished by heating or by the use of a stripping gas or both. Alcohol vapors may be recovered from air or other gases using synthetic gels, fuller's earth, charcoal, and the like.

The above-named uses for the invention are given for illustrative purposes, it being understood that other applications will occur to those skilled in the art.

The terms "adsorbents," "adsorbent materials" and the like are intended to mean materials capable of retaining considerable volumes of gases whether or not such retention is in fact accomplished by adsorption, absorption, occlusion, or other phenomena.

Having described the preferred embodiment of the invention, it will be understood that it embraces such other variations and modifications as come within the spirit and scope thereof.

This application forms a division of application Serial No. 381,294, filed March 1, 1941, which issued as Patent No. 2,446,076 on July 27, 1948.

What is desired to be protected by Letters Patent is:

1. A continuous process for treating a gaseous hydrocarbon mixture to remove butadiene therefrom, which comprises suspending finely-divided cuprous chloride in said gaseous mixture containing butadiene, passing the resulting suspension upwardly into a treating zone wherein the cuprous chloride is maintained as a dense turbulent fluidized suspension and the butadiene is selectively removed from the gaseous mixture by the cuprous chloride, flowing the fluidized suspension from an upper part of said treating zone into a separation zone wherein said cuprous chloride retaining butadiene is separated from the rest of the treated gaseous mixture, transferring the separated cuprous chloride with butadiene retained thereby in a free flowing stream from the separation zone into a stream of inert stripping gas, passing the resulting suspension of cuprous chloride with retained butadiene in the inert stripping gas up through an indirect heat exchange zone where the thus suspended cuprous chloride is heated, withdrawing the thus heated suspension from the indirect heat exchange zone, passing the heated suspension of cuprous chloride in the inert stripping gas upwardly through a stripping zone wherein the butadiene is stripped from the cuprous chloride, separating the butadiene with the inert stripping gas from the stripped cuprous chloride and returning the stripped cuprous chloride to said treating zone.

2. The process as described in claim 1, in which the stripped cuprous chloride is returned to the treating zone by being suspended in the gaseous hydrocarbon mixture containing butadiene, and said gaseous hydrocarbon mixture with the cuprous chloride suspended therein is passed through a heat exchange zone before being passed upwardly into the treating zone.

EGER V. MURPHREE.

(References on following page)

REFERENCES CITED

The following references are of record in the file of this patent:

UNITED STATES PATENTS

| Number | Name | Date |
|---|---|---|
| 1,577,534 | Miller | Mar. 23, 1926 |
| 1,825,707 | Wagner | Oct. 6, 1931 |
| 2,270,903 | Rudbach | Jan. 27, 1942 |
| 2,336,643 | Schulze | Dec. 14, 1943 |
| 2,386,734 | Wolk | Oct. 9, 1945 |
| 2,446,076 | Campbell et al. | July 27, 1948 |
| 2,451,804 | Campbell et al. | Oct. 19, 1948 |

FOREIGN PATENTS

| Number | Country | Date |
|---|---|---|
| 533,037 | Germany | Sept. 8, 1931 |

OTHER REFERENCES

Lur'e et al., Sinteticheskii Kauchuk, 1934, No. 6, pages 19–29. A–35 page translation of this article is in Division 31.

Gilliland et al., J. A. C. S., vol. 63, pages 2088–2090, August 1941.